United States Patent [19]
Vernon et al.

[11] 3,719,588
[45] March 6, 1973

[54] HYDROTREATING OF HYDROCARBONACEOUS LIQUIDS WITH CARBON MONOXIDE-CONTAINING TREAT GAS

[75] Inventors: Lonnie W. Vernon; Robert E. Pennington, both of Baytown, Tex.

[73] Assignee: Esso Research and Engineering Company, Linden, N.J.

[22] Filed: Oct. 26, 1970

[21] Appl. No.: 84,089

[52] U.S. Cl. ............208/209, 208/89 R, 208/244 R, 208/254 R, 208/214 R, 208/291 R
[51] Int. Cl. .............................................C10g 17/00
[58] Field of Search........208/244, 89, 209, 291, 214, 208/254

[56] References Cited

UNITED STATES PATENTS

| | | | |
|---|---|---|---|
| 2,917,532 | 12/1959 | Watkins | 208/209 |
| 809,087 | 1/1906 | Blackmore | 208/244 |
| 2,615,831 | 9/1952 | Bishop | 208/244 |
| 3,367,862 | 2/1968 | Mason et al. | 208/243 |
| 2,901,423 | 8/1959 | Herbert et al. | 208/264 |
| 486,406 | 10/1892 | Huston | 208/209 |

FOREIGN PATENTS OR APPLICATIONS

| | | | |
|---|---|---|---|
| 1,082,509 | 9/1967 | Great Britain | 208/209 |
| 1,149,707 | 4/1969 | Great Britain | 208/209 |

*Primary Examiner*—Delbert E. Gantz
*Assistant Examiner*—J. Nelson
*Attorney*—Thomas B. McCulloch, Melvin F. Fincke, John S. Schneider and Sylvester W. Brock, Jr.

[57] ABSTRACT

Hydrocarbonaceous liquids containing combined nitrogen and sulfur and boiling within the range from about 350° F. to about 1,000° F. can be hydrotreated in the presence of a carbon monoxide-sensitive hydrogenation catalyst with a carbon monoxide-containing treat gas containing at least 2 volume percent CO if from 1 to 20 mols of steam per mol of carbon monoxide are present in the treat gas. The treat gas may also contain from 0 to 96 volume percent of hydrogen. In the preferred mode, a coal-derived liquid boiling within the range from 350° to 1,000° F. is hydrotreated in the presence of cobalt molybdate catalyst by a treat gas obtained as a synthesis gas and containing about 3 mol percent CO and 10 mol percent $H_2O$, the hydrotreating conditions including a temperature from about 650° F. to about 800° F., a pressure from about 500 psig to about 2,500 psig, a treat gas-to-liquid ratio from about 3,000 SCF/B to about 12,000 SCF/B and a liquid space velocity from about 0.5 W/Hr/W to about 2.0 W/Hr/W.

13 Claims, 1 Drawing Figure

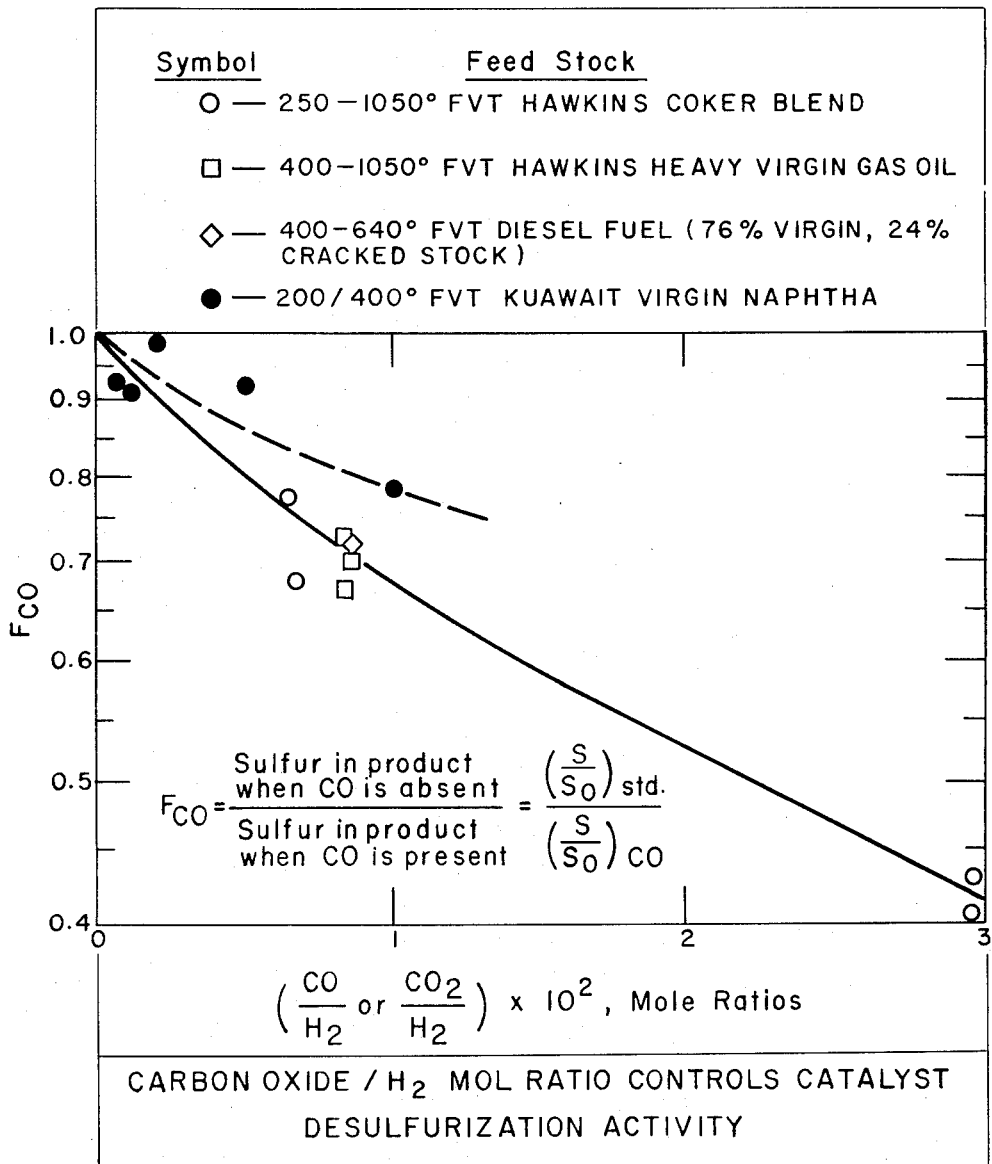

HYDROTREATING OF HYDROCARBONACEOUS LIQUIDS WITH CARBON MONOXIDE-CONTAINING TREAT GAS

BACKGROUND OF THE INVENTION

1. Field of the Invention

The present invention is directed to the catalytic hydrotreating of hydrocarbonaceous liquids containing nitrogen. In particular, the present invention is directed to the discovery that the introduction of steam along with a carbon monoxide-containing treat gas offsets the inhibitory action of the carbon monoxide with respect to the hydrotreating catalyst.

2. Description of the Prior Art

The hydrotreating of hydrocarbonaceous liquids is well known in the art. It is carried out to reduce the nitrogen and sulphur contents of the hydrocarbonaceous stream, and to add hydrogen to the hydrocarbonaceous material. In the treatment of coal-derived liquids in particular, the removal of nitrogen and sulfur, and the addition of hydrogen, are particularly important. Where a carbon monoxide-sensitive catalyst is monoxide-free hydrogen for hydrogenation, the prior art has utilized a carbon monoxide-free hydrogen stream as a treat gas. Particularly where a synthesis gas is used as a treat gas, residual carbon monoxide is removed or converted to methane before the treat gas is introduced into the hydrotreating zone. By the present invention, not only is this removal of carbon monoxide made unnecessary, but it has been found that carbon monoxide itself, in admixture with steam, can be used as the sole source of treat gas in the hydrotreating of hydrocarbonaceous liquids. The hydrogen produced in situ by reaction of the carbon monoxide and water is sufficient to carry out the hydrotreating process. If desired, however, treat gas containing hydrogen as well as carbon monoxide may be employed.

The addition of steam into the hydrogenation treat gas has been disclosed in U.S. Pat. No. 2,901,423 as a means for avoiding the buildup of deposits and incrustations in heat exchanges or on catalyst beds. The U.S. Pat. No. 2,901,423, however, apparently dealt with hydrogenation catalysts which are not sensitive to carbon monoxide, since the use of steam is disclosed to be optional and not, as in the present case, mandatory. The U.S. Pat. No. 2,901,423 does not mention the problem of carbon monoxide inhibition.

The hydrotreating of hydrocarbonaceous liquids requires large amounts of hydrogen. Pure hydrogen, such as that obtained from reforming operations, is in short supply and therefore it is necessary to generate hydrogen by reaction of steam with a hydrocarbon source, such as natural gas. The synthesis gas is originally produced as an admixture of carbon monoxide, some carbon dioxide, and hydrogen. This raw synthesis gas is then passed through a shift converter to react the carbon dioxide and additional hydrogen. Residual carbon monoxide of the order of about 3 percent of the total synthesis gas still remains, however, and it is the common practice to pass the "shifted" gas stream through a methanator to react the residual carbon monoxide with hydrogen and produce methane. This has been thought to be necessary to avoid inhibition or poisoning of the hydrotreating catalyst by the carbon monoxide which is present even in the shifted gas.

By the present invention, it has been found that not only is the residual carbon monoxide suitably left in the synthesis gas, but that the shift reaction itself need not necessarily be carried out prior to use of the raw synthesis gas. It has further been found that carbon monoxide and steam in admixture, without hydrogen being present, can be used for hydrotreating hydrocarbonaceous materials.

SUMMARY OF THE INVENTION

The present invention relates to the use of a carbon monoxide-containing treat gas in the hydrotreating of hydrocarbonaceous materials containing combined nitrogen and sulfur. In view of the high nitrogen and sulfur contents of coal-derived liquid, and the hydrogen deficiency thereof, the present invention is particularly applicable to the hydrotreating of liquids obtained from the liquefaction of coal.

Exemplary of the liquid feedstocks which are suitably hydrotreated according to the present invention are nitrogen-containing virgin gas oils obtained from crude petroleum oil, such as Hawkins crude, Kuwait crude, etc. It is also suitable for the treatment of coker oils and other process streams which contain nitrogen and which are obtained from petroleum refining operations. In particular, however, the present invention is applicable to hydrotreating of coal liquefaction products. As exemplary of the liquid feed streams which can be used in the present invention, inspection data of several typical such stocks are given below in Table I.

TABLE I

| Feedstock | creosote oil | coal liquids | heavy pet. gas oil | light pet. gas oil |
|---|---|---|---|---|
| Specific gravity | 1.054 | 1.105 | — | — |
| Sulfur, wt. % | 0.6 | 0.7 | 0.3 | 1.25 |
| Nitrogen, wt. % | 0.9 | 0.7 | 0.5 | .03 |
| Distillation, °F. | | | | |
| IBP | 400 | 350 | 650 | 450 |
| EP | 700 | 1000 | 1100 | 660 |

The treat gas which is used in the present invention comprises carbon monoxide, steam, and (if desired) hydrogen. The process will be most useful when a synthesis gas is used as the treat gas, since this synthesis gas is easily obtained from commercial sources. It is to be understood, however, that a substantially pure carbon monoxide stream may also be used in admixture with steam as the treat gas if such a stream is available. The presence of hydrocarbons such as methane and ethane are not deleterious in the present process, but act mainly as diluents.

As exemplary of the treat gasses which can be used in the present process, the constituents of several such gases are shown below in Table II.

TABLE II

| treat gas | raw synthesis gas* | unmethanated hydrogen product | carbon monoxide |
|---|---|---|---|
| $H_2$, vol.% | 28 | 87 | 0 |
| CO, vol.% | 30 | 3 | 50 |
| $CO_2$, vol.% | 12 | 0 | 0 |
| $H_2O$, vol.% | 30 | 10 | 50 |
| | 100 | 100 | 100 |

*Made from coal char by steam reforming.

The hydrotreating step is carried out under conditions generally known to those skilled in the art. Hydrotreating catalysts, effective for desulfurization, denitrogenation, and hydrogenation are known to be deleteriously affected by the presence of carbon monoxide in the treat gas. These catalysts include the oxides and/or sulfides of molybdenum, molybdenum, nickel-molybdenum, nickel-tungsten, nickel-molybdenumtungsten, and cobalt-nickel-molybdenum. A suitable cobalt molybdate catalyst comprises 3 weight percent cobalt oxide, 13 weight percent molybdenum oxide, and 83 percent alumina as an inert support. This catalyst is preferred.

The hydrotreating conditions will suitably include a temperature from about 650° F. to about 800° F. (preferably about 725° F.), a pressure from about 500 psig to about 2,500 psig (preferably about 1,000 psig), a liquid space velocity from about 0.5 W/Hr/W to about 2.0 W/Hr/W (preferably about 1.0 W/Hr/W), and a treat gas rate from about 3,000 SCF/B to about 12,000 SCF/B (preferably about 8,000 SCF/B). Under mild hydrotreating conditions, these operating conditions will be correlated to avoid substantial hydrocracking of the liquid, although it is contemplated by the present invention that some hydrocracking may be desired and can be carried out.

The Treat Gas

As will be seen in the examples given hereinafter, the presence of carbon monoxide has heretofore been considered to be deleterious, inhibiting the denitrogenation, desulfurization, and hydrogenation activities of the catalyst. Referring to the sole FIGURE of the drawing, it can be seen that the presence of carbon monoxide in the treat gas decreases the sulfur removal, in proportion to the amount of carbon monoxide in the gas. This phenomenon has also been discussed by Blue and Spurlock in *Chemical Engineering Progress*, Vol. 56, page 54, 1960. The data given in Examples 1 and 2, hereinafter, show that this deleterious effect is real and reduces both denitrogenation and desulfurization activity when treating feedstocks derived from a variety of sources. Surprisingly, however, the present inventors have discovered that the deleterious effect of carbon monoxide can at least in part be offset by the introduction of steam along with carbon monoxide. It has been found that a treat gas comprising essentially of from 0 to 96 mol percent hydrogen, from 2 to about 50 volume percent carbon monoxide and from about 2 to about 50 volume percent of steam can be employed, if the steam-to-carbon monoxide mol ratio is from 1 to about 10. In the preferred synthesis gas, the treat gas will consist of about 87 volume percent hydrogen, about 3 volume percent carbon monoxide, and about 10 volume percent steam, providing a steam-to-carbon monoxide mol ratio of about 3.

Although the present inventors are not required to explain the mechanism of their invention, following is a description of the inventors' theory of operation. It is believed that the presence of steam is effective to counteract the carbon monoxide which is chemisorbed on the surface of the hydrogenation catalysts, the chemisorbed carbon monoxide reacting with the steam to produce nascent hydrogen which is very reactive and which is produced right at the catalytic site. The continual reaction of chemisorbed carbon monoxide with the steam which is present prevents the carbon monoxide from acting as a barrier to catalytic activity, and instead provides a very active source of hydrogen for reaction with the nitrogen, sulfur, or unsaturated portions of the hydrocarbonaceous liquids.

The nature of the present invention will be better understood by reference to the following examples, which illustrate the deleterious effect of carbon monoxide when it is introduced into a hydrogen treat gas stream, which show the unexpectedly exceptional effect of steam addition, and which show the effectiveness of the present invention in allowing the use of a low-cost synthesis gas for hydrotreating, rather than the more expensive purified hydrogen which is obtained by methanation of the synthesis gas.

EXAMPLES

EXAMPLE 1

In order to illustrate the deleterious effect of carbon monoxide on catalyst desulfurization activity, the following data are provided. The data were obtained from the treatment of various petroleum fractions from different sources. Hydrotreating was carried out under the indicated conditions over a cobalt molybdate catalyst.

| feed, °F | temp. °F | Press. psig | gas rate SCF/B | CO mol % | $H_2$ mol % | $F_{co}$* |
|---|---|---|---|---|---|---|
| 250/1050 (Hawkins Coker) | 700 | 400 | 3000 | 0.7 | 98 | 0.77; 0.68 |
| 250/1050 (Hawkins Coker) | 700 | 400 | 3000 | 2.8 | 94 | 0.41; 0.43 |
| 400/1050 (Hawkins) | 725 | 400 | 2300 | 0.4 | 68 | 0.74; 0.70; 0.67 |
| 400/640 (Diesel Fuel) | 710 | 165 | 860 | 0.5 $CO_2$ | 57.5 | 0.72 |
| 200/400 (Kuwait) | 550 | 250 | 325 | 0.04 | 33 | 0.92 |
| 200/400 (Kuwait) | 550 | 250 | 2500 | 0.4 | 89 | 0.92 |

*$F_{co}$ = (S in product/S in feed when CO is absent)/(S in product/S in feed when CO is present)

The data from these runs are plotted in the drawing and show a decrease in desulfurization activity with increasing amounts of carbon monoxide

EXAMPLE 2

In order to show the deleterious effect of carbon monoxide on denitrogenation and hydrogenation activity, the following data are given.

A raw creosote oil (similar to that obtained from coal liquefaction) boiling over the range from 400° to 700° F. was charged at the rate of 5.25 g/hr to a bench-scale continuous hydrotreating reactor containing 5.37 g of a cobalt molybdate catalyst comprising 3 weight percent cobalt oxide and 13 weight percent molybdenum oxide on 84 weight percent of alumina support. Hydrogen was passed through the reactor at a rate of 10 liters/hour. Where indicated below, steam and/or carbon monoxide were also passed through the reactor at rates sufficient to obtain the specified $CO/H_2$ and $H_2O/H_2$ mol ratios. The reactor was maintained at 725°

F. and 1,000 psig during the runs, while the feed rate was 0.98 W/Hr/W. All data were obtained after the reactor had lined out and reached steady-state conditions.

| Treat Gas | | $DeN_2$ Activity | Hydrogenation Activity |
|---|---|---|---|
| Components | $CO/H_2$  $H_2O/H_2$ | $K_N$* | $K_H$** |
| Pure $H_2$ | — — | 1.26 | 0.94 |
| $H_2$ and CO | 0.3 — | 0.84 | 0.81 |

*$K_N = (W/H/W) \ln (^N\text{feed}/^N\text{prod})$
**$K_H = (W/H/W) \ln [^H\text{max} - ^H\text{feed}/^H\text{max} - ^H\text{prod}]$ where $H_{max}$ is 10.0.

Note that the presence of only 3 percent carbon monoxide reduced the denitrogenation activity by 33 percent and reduced the hydrogenation activity by 14 percent. Data also indicated that 38 percent of the carbon monoxide was converted into methane, consuming 3 mols of hydrogen per mol of methane produced, constituting a net loss of valuable hydrogen.

EXAMPLE 3

In order to illustrate the exceptional effect of steam addition, the following data are given.

The raw creosote oil of Example 2 was hydrotreated with an equimolar mixture of carbon monoxide and steam. No hydrogen was separately charged, although hydrogen was formed in situ by the reaction between water and CO. The same reactor was used as in Example 2, under conditions including a temperature of 750° F., a pressure of 1,000 psig, a liquid feed rate of 0.79 g/hr/g of catalyst (i.e., the W/H/W was equal to 0.79), and a steam/oil weight ratio of 1.6. The following results were obtained.

| | Feed | Product |
|---|---|---|
| Wt. % Sulfur | 0.55 | 0.023 |
| Wt. % Nitrogen | 0.88 | 0.31 |
| Specific gravity | 1.0535 | 1.0172 |

Note that 96 percent desulfurization and 65 percent denitrogenation were obtained even though no extrinsic hydrogen was added. Note also that the reduction in oil specific gravity indicates that some hydrogenation was also accomplished.

EXAMPLE 4

The procedure of Example 3 was followed while using an equimolar mixture of hydrogen, steam and carbon monoxide and also while using pure hydrogen at varying partial pressures. The W/H/W was 0.78, otherwise the conditions were identical to Example 3.

The following results were obtained:

| Treat Gas | | | $H_2$ partial pressure, psi | product nitrogen wt. % |
|---|---|---|---|---|
| Components | $CO/H_2$ | $H_2O/CO$ | | |
| Pure $H_2$ | — | — | 920 | 0.17 |
| Pure $H_2$ | — | — | 640 | 0.33 |
| Pure $H_2$ | — | — | 370 | 0.50 |
| $CO + H_2O$* | 1.0 | — | — | 0.31 |
| $CO+H_2O+H_2$ | 1.0 | 1.0 | 380 | 0.41 |

*From Example 2.

Note that the use of synthesis gas provided superior denitrogenation as compared to use of pure hydrogen at the same partial pressure, and that the use of CO and steam, without addition of extrinsic hydrogen, was surpassed in denitrogenation activity only when hydrogen partial pressures in excess of 640 psi were employed. This illustrates the unexpectedly great benefits to denitrogenation activity flowing from the use of steam with carbon monoxide. Compare this with the loss in denitrogenation activity which is suffered when carbon monoxide and hydrogen are employed (Example 2).

EXAMPLE 5

The procedure of Example 2 was followed while employing the conditions set out therein. Varying mixtures of CO, $H_2O$ and $H_2$ were used as the treat gas. The results are shown below in Table III. The results from Example 2 are also included for comparison.

TABLE III

| | | | | Results of Examples 2 and 3 | | | | |
|---|---|---|---|---|---|---|---|---|
| Components | $CO/H_2$ | $H_2O/H_2$ | $H_2O/CO$ | Denitrogenation activity, $K_N^1$ | Hydrogenation activity, $K_H^2$ | $H_2$ content of products, weight percent[3] | Percent CO converted to $CH_4$ | Percent Co converted to $CO_2$ |
| Pure $H_2$ | 0 | 0 | 0 | 1.26 | 0.95 | 9.05 | | |
| $H_2/CO$ | 0.03 | 0 | 0 | 0.84 | 0.81 | 8.88 | 38 | |
| $H_2/CO/H_2O$ | 0.03 | 0.50 | 17 | 0.96 | 0.54 | 8.43 | 5 | 71 |
| $H_2/CO/H_2O$ | 0.03 | 0.25 | 8 | 0.99 | 0.62 | 8.56 | 7 | 68 |
| $H_2/CO/H_2O$ | 0.03 | 0.12 | 4 | 0.94 | 0.68 | 8.66 | 12 | 51 |

[1] $K_N = (W/H/W) n \frac{No}{N}$.

[2] $K_H = (W/H/W) n \left( \frac{H_{max} - H_{feed}}{H_{max} - H_{prod}} \right)$.

[3] Obtained from specific gravity correlation.

The carbon monoxide content was maintained at 3 percent to provide a basis of comparison. Note that as the $H_2O/CO$ ratio was increased from 4 to 17, the denitrogenation activity did not change appreciably but passed through a maximum of 0.99 at a $H_2O/CO$ ratio of 8. Note also that the hydrogenation activity declined continuously from 0.68 to 0.54, but that the percent carbon monoxide converted to methane also declined from 12 percent to 5 percent. The decline in hydrogenation activity can be compensated for and the saving in hydrogen losses to methane preserved by increasing the pressure. Note also that the percent of carbon monoxide converted to $CO_2$ increases to 71 percent from 51 percent. This is indicative of an increase in the reaction between carbon monoxide and steam to produce additional hydrogen. Thus, the higher stream/hydrogen ratio can be employed when economics of investment allow it. Addition of steam to treat gas decreased the percent of CO converted to methane from 38 percent to a level of 5 to 12 percent; this reduces the costly consumption of hydrogen. The addition of steam also increased the denitrogenation activity while maintaining an acceptably high hydrogenation activity.

Having disclosed our invention, and the preferred mode of using it, what is to be covered by Letters Patent is set forth in the appended claims.

We claim:

1. A process for hydrotreating a hydrocarbonaceous liquid boiling within the range from about 400° F. to about 900° F., which comprises: in a hydrotreating zone, contacting said liquid with a carbon monoxide-sensitive hydrotreating catalyst and with a treat gas consisting essentially of carbon monoxide and steam, the mol ratio of steam-to-carbon monoxide being from 1 to 10, under reaction conditions sufficient to hydrotreat said liquid.

2. A process in accordance with claim 1 wherein the catalyst is chosen from the group consisting of cobalt molybdate, nickel molybdate and nickel tungsten sulfide.

3. A process in accordance with claim 1 wherein the reaction conditions include
a temperature from about 650° to 800° F.,
a pressure from about 500 psig to about 2,000 psig,
a treat gas-to-liquid ratio from about 3,000 to about 12,000 SCF/B, and
a space velocity from about 0.5 to about 2.0 W/H/W.

4. A process in accordance with claim 3 wherein the ratio of steam to carbon moxide is about 1.

5. A process for hydrotreating a coal-derived liquid boiling within the range from about 350° F. to about 700° F. which comprises
in a hydrotreating zone, contacting said liquid with a carbon monoxide-sensitive catalyst chosen from the group consisting of cobalt molybdate, nickel molybdate and nickel tungsten sulfide and with a treat gas consisting essentially of carbon monoxide and steam
the mol ratio of steam to carbon monoxide being from 1 to 10, and
the reaction conditions including
a temperature from about 650° F. to about 800° F.,
a pressure from about 500 to about 2,000 psig,
a treat gas-to-liquid ratio from about 3,000 to about 12,000 SCF/B, and
a space velocity from about 0.5 to about 2.0 W/H/H,
whereby said coal-derived liquid is hydrotreated.

6. A process for hydrotreating a hydrocarbonaceous liquid boiling within the range from about 350° F. to about 1,000° F. and containing at least 0.1 weight percent of combined nitrogen which comprises:
in a hydrotreating zone contacting said liquid in the mixed liquid-gas phase with a treat gas and a hydrotreating catalyst which is inhibited by carbon monoxide,
said treat gas comprising
from 0 to 96 volume percent hydrogen,
from 2 to 50 volume percent carbon monoxide and
from 2 to 50 volume percent steam, the steam-to-carbon monoxide mol ratio being from 1 to 10, under hydrotreating conditions chosen to hydrotreat said liquid.

7. A process in accordance with claim 6 wherein the catalyst is cobalt molybdate.

8. A process in accordance with claim 7 wherein the treat gas contains
about 87 volume percent hydrogen,
about 3 volume percent carbon monoxide, and
the steam-to-carbon monoxide mol ratio is from about 3 to about 10.

9. A process in accordance with claim 8 wherein the liquid is derived from coal liquefaction.

10. A process in accordance with claim 9 wherein the liquid inspection data are about as follows:

| | |
|---|---|
| Specific Gravity | 1.105 |
| Sulfur, weight percent | 0.7 |
| Nitrogen, weight percent | 0.7 |
| IBP | 350° F. |
| EP | 700° F. |

11. A process for hydrotreating a hydrocarbonaceous liquid obtained by coal liquefaction and boiling within the range from about 350° F. to about 900° F.,
said liquid containing from about 0.1 to about 1.0 weight percent of combined nitrogen,
which comprises:
in a hydrotreating zone and in the liquid phase, contacting said liquid with a hydrotreating catalyst chosen from the group consisting of cobalt molybdate, nickel molybdate and nickel tungsten sulfide and a treat gas comprising from 0 to about 87 volume percent hydrogen, from about 2 to about 3 volume percent carbon monoxide and from about 10 to about 20 volume percent steam,
the steam-to-carbon monoxide mol ratio being from about 3 to about 10,
under hydrotreating conditions comprising:
a temperature from about 650° F. to about 800° F.,
a pressure from about 500 psig to about 2,500 psig,
a space velocity from about 0.5 W/H/W to about 2.0 W/H/W, and
a treat gas rate from about 3,000 SCF/B to about 12,000 SCF/B,
said hydrotreating conditions being correlated to avoid substantial hydrocracking of said liquid, whereby the nitrogen content of said liquid is decreased and the hydrogen content of said liquid is increased.

12. A process in accordance with claim 11 wherein the catalyst is cobalt molybdate.

13. A process in accordance with claim 12 wherein:
the temperature is about 750° F.,
the pressure is about 1,000 psig,
the space velocity is about 0.78 W/H/W, and
the treat gas rate is about 8,000 SCF/B.

* * * * *